United States Patent [19]

Sakatani et al.

[11] Patent Number: 5,046,863
[45] Date of Patent: Sep. 10, 1991

[54] DYNAMIC PRESSURE BEARING DEVICE

[75] Inventors: Ikunori Sakatani; Takeyuki Yoshiba, both of Fujisawa; Katsuhiko Tanaka, Yamato, all of Japan

[73] Assignee: Nippon Seiko Kabushiki Kaisha, Tokyo, Japan

[21] Appl. No.: 610,000

[22] Filed: Nov. 7, 1990

[30] Foreign Application Priority Data

Nov. 7, 1989 [JP] Japan .................................. 1-288993

[51] Int. Cl.[5] .................................................. F16C 21/00
[52] U.S. Cl. .................................... 384/101; 384/115; 384/126; 384/292
[58] Field of Search ............... 384/101, 292, 126, 115, 384/118, 114

[56] References Cited

U.S. PATENT DOCUMENTS

| | | | |
|---|---|---|---|
| 1,321,478 | 11/1919 | Russler | 384/292 |
| 4,523,800 | 6/1985 | Yamashita et al. | 384/115 |
| 4,596,474 | 6/1986 | Van Roemburg | 384/114 |
| 4,797,009 | 1/1989 | Yamazaki | 384/115 |
| 4,856,918 | 9/1989 | Inoue et al. | 384/610 |

Primary Examiner—Lenard A. Footland
Attorney, Agent, or Firm—Basile and Hanlon

[57] ABSTRACT

A dynamic pressure bearing device induced a housing having a sleeve and a thrust receiver and a shaft fit into the sleeve. Herringbone-shaped grooves for generating dynamic pressure comprising outer groove segments and inner group segments are disposed to at least one of the inner cylindrical surface of the sleeve and the outer cylindrical surface of the shaft at two axially spaced apart positions. The axial length of the outer groove segment is longer than that of the inner groove segment, and the difference of the axial length for the outer and the inner groove segments is greater in the lower herringbone-shaped grooves than in the upper herringbone-shaped grooves.

1 Claim, 2 Drawing Sheets

DYNAMIC PRESSURE BEARING DEVICE

BACKGROUND OF THE INVENTION

1. Field of the Invention

The present invention concerns an improvement for a dynamic pressure bearing device used, for example, in information appliances or audio and video appliances and, more in particular, it relates to an improvement for the rotational accuracy and the durability.

2. Description of the Prior Art

There has been known a conventional dynamic pressure bearing device of this kind, for example, as shown in FIG. 4 of the appended drawings. This prior art discloses a dynamic pressure bearing device of a cylinder for a magnetic head used in a digital audio tape recorder (DAT), a video tape recorder (VTR) or the like, and it rotatably supports an upper cylinder 2 having a pair of heads 1 at the circumferential edge thereof.

That is, a shaft 4 stands vertically at the axial center of a lower cylinder 3. On the other hand, a housing 5 of the dynamic pressure bearing device is secured to the axial center of the upper cylinder 2. The housing 5 as a rotational body has a sleeve 6 and a thrust receiver 7 made of a steel ball attached to one end thereof, and it is rotatably fit to the shaft 4. The sleeve 6 has cylindrical radial bearing surfaces 8 formed on its inner diametrical surface at two axially spaced apart positions, while the thrust receiver 7 has a thrust bearing surface 9. On the other hand, a shaft 4 fit into the sleeve 6 has a radial receiving surface 10 opposed to the radial bearing surface 8 with a gap of a radial bearing and a thrust receiving surface 11 opposed to the thrust bearing surface 9 being in contact therewith. Lubricant pits 12 are disposed in the vicinity of the thrust bearing surface 9 and an air escape aperture 13 is disposed at a portion between the inner diametrical surface of the sleeve 6 and the thrust receiver 7 for communicating the lubricant pit 12 with the external atmosphere. Herringbone-shaped grooves 15 are formed to the radial receiving surface 10. The herringbone-shaped grooves 15 comprise circumferential rows of inner spiral groove segments 15A each disposed on the side between the radial bearing surfaces 8, 8 at two upper and lower positions and circumferential rows of outer spiral groove segments 15B each disposed on the side opposite thereto, that is, on the axially outer side.

The upper cylinder 2 is driven rotationally by an incorporated motor 20 around the shaft 4 as the center. When the upper cylinder 2 rotates, the pressure of a lubricant filled in the gap of the radial bearing is increased under the pumping effect of the herringbone-shaped groove 15 on the shaft 4, by which the sleeve 6 is supported radially to the shaft 4 being kept free from contact therewith. Simultaneously, the steel ball of the thrust receiver 7 is axially supported being in contact with the thrust receiving surface 11 at the upper end of the shaft 4.

The rotationally driving motor 20 comprises a cylindrical rotor magnet 21 attached to the lower surface of the upper cylinder 2 and a stator coil 22 attached in a face-to-face fashion to the inner circumferential surface of the lower cylinder 3. Further, a stationary cylindrical rotary transformer 23 disposed along the outer circumference of the sleeve 6 is attached to the lower cylinder 3. On the other hand, a rotatable rotary transformer 24 opposed in a face-to-face fashion to the outer circumferential surface of the stationary rotary transformer 23 is attached to the upper cylinder 2. Then, a signal taken out of a magnetic heads 1 attached to the upper cylinder 2 is transmitted by way of the rotatable rotary transformer 24 to the stationary rotary transformer 23.

When the stater coil 22 of the rotationally driving motor 20 is energized, a rotating force is generated in the rotor magnetic 21, and the sleeve 6 and each of accessory parts secured thereto are rotated as a unit.

The dynamic pressure bearing device used for a cylinder of a magnetic head as described above is required to have high rotational accuracy and long lasting durability.

However, in the conventional dynamic pressure bearing device involves a problem that a lubricant such as oil or grease filled in the gap of the radial bearing between the radial bearing surface 8 and the radial receiving surface 10 and in the lubricant pits 12 is gradually forced out and discharged from the gap of the radial bearing and the lubricant pits 12 during rotation, thereby bringing about the change of torque in the bearing to reduce the rotational accuracy and, in a worst case, causing scorching of the bearing.

Further, there is also a problem that the lubricant leaked and discharged through the gap of the bearing is scattered by centrifugal force to contaminate the magnetic heads 1 thereby bringing about a worry that the device can no more function correctly.

In view of the above, we have made various experiments trying to find out the causes for the discharge of the lubricant and, as a result, could confirmed the followings. That is, the groove pattern of the herringbone-shaped grooves 15 is usually formed as a symmetrical configuration. Accordingly, the axial length a for each of the outer groove segments 15B in the upper herringbone-shaped grooves 15 should be equal with the axial length b for each of the inner groove segments 15A in the upper herringbone-shaped grooves 15 (a=b), while the axial length c for each of the inner groove segments 15A should be equal with the axial length d for each of the outer groove segments 15B in the lower herringbone-shaped grooves 15 (c=d).

However, it may sometimes occur actually that the length of the inner groove segment 15A is greater than the length of the outer groove segment 15B (a<b, c>d) by a slight asymmetry due to fabrication error upon fabrication of the grooves. This brings about a so-called pumping out effect in which the lubricant filled in the bearing is gradually forced out of the sleeve 6 accompanying with the rotation of the sleeve 6.

OBJECT OF THE INVENTION

It is, accordingly, an object of the present invention to overcome the foregoing problems in the prior art and provide a dynamic pressure bearing device capable of preventing the degradation of the rotational accuracy caused by the change of torque, having good endurance and free from scattering of the lubricant, by adapting such that the lubricant is not forced out externally from the inside of the bearing during rotation due to the fabrication error for the groove pattern of the herringbone-shaped grooves.

SUMMARY OF THE INVENTION

The foregoing object of the present invention can be attained in a dynamic pressure bearing device comprising a housing having a sleeve, a thrust receiver secured to one end of the sleeve and a shaft fit into the sleeve, in which the sleeve has cylindrical radial bearing surfaces formed on its inner diametrical surface at two axially spaced apart positions, the thrust receiver has a thrust bearing surface, the shaft has a radial receiving surface opposed to the radial bearing surface and a thrust receiving surface opposed to the thrust bearing surface, lubricant pits are disposed near the thrust bearing surface, an air escape aperture is disposed in the housing for communicating the lubricant pits with external atmosphere, at least one of the radial bearing surface and the radial receiving surface has herringbone-shaped grooves formed thereon that comprise inner spiral groove segments each disposed on the side between said radial bearing surfaces at the two position and outer spiral groove segments each disposed in a direction different from that of the inner groove segments and in the axially outer side, wherein each of the outer groove segments has a longer axial length than that for each of the inner groove segments, and the difference of the axial length between each of the outer groove segments and the inner groove segments in the herringbone-shaped grooves disposed on the side opposite to the thrust receiving surface is made greater than the difference of the axial length between each of the outer groove segments and each of the inner groove segments in the herringbone-shaped grooves disposed on the side of the thrust receiving surface.

Since the herringbone-shaped grooves in the radial bearing are formed such that the axial length for each of the outer groove segments is longer than that of the inner groove segments, the lubricant is not forced out of the bearing due to the dynamic pressure upon rotation.

Further, since the outer groove segment is formed such that the axial length thereof is longer than that of the inner groove segment, and the difference of the axial length between the inner groove segment and the outer groove segment in the herringbone-shaped grooves on the side opposite to the thrust receiving surface is made greater than the difference of the axial length between the inner groove segment and the outer groove segment in the herringbone-shaped grooves on the side of the thrust receiving surface, discharge of the lubricant from the side opposite to the thrust receiving surface can surely be prevented.

BRIEF DESCRIPTION OF THE ACCOMPANYING DRAWINGS

These and other objects, as well as advantageous features of the present invention will become apparent by reading an following description of the preferred embodiments according to the present invention with reference to the accompanying drawings, wherein.

DESCRIPTION OF THE PREFERRED EMBODIMENTS

Figure 1:
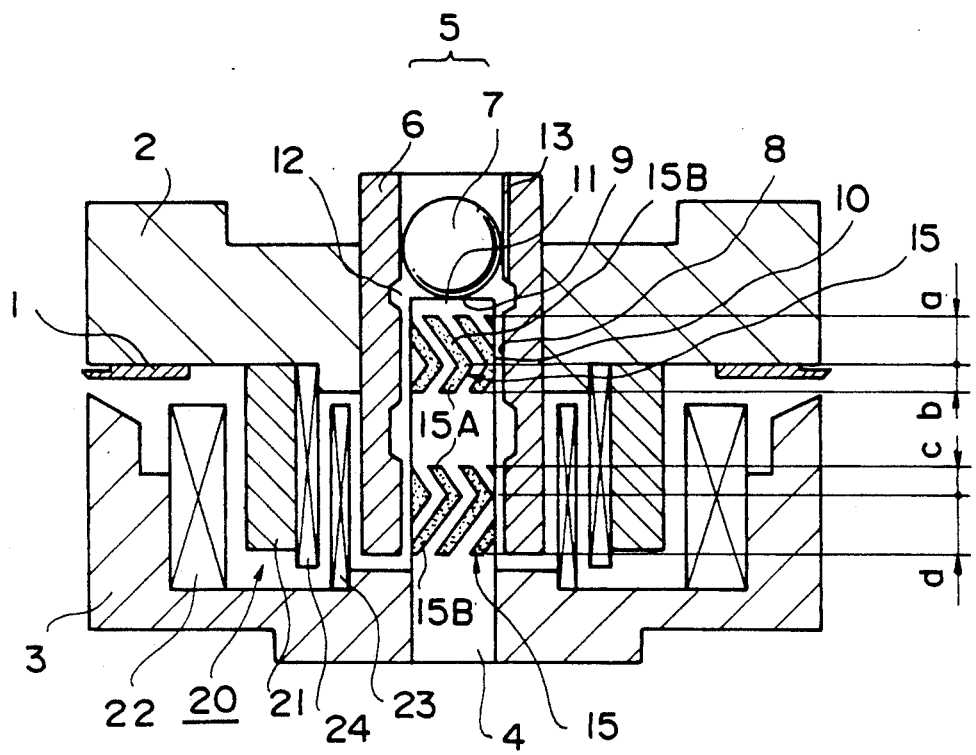
FIG. 1 is a vertical cross sectional view of a dynamic pressure bearing device as one embodiment according to the present invention.

Preferred embodiments of the present invention will now be explained referring to the drawings.

FIG. 1 shows an embodiment according to the present invention, which is placed vertically with the thrust receiver 7 being upward. Identical or corresponding portions with those in the prior art device carry the same reference numerals.

The groove pattern of the herringbone-shaped grooves 15 disposed circumferentially on the radial receiving surface 10 at two axially spaced apart positions are formed such that the axial length for each of the outer groove segments 15B is made longer than that for each of the inner groove segments 15A ($a > b$, $c < d$).

Therefore, even if there is a fabrication error, the pumping effect is always exerted toward the inside of the dynamic pressure bearing device and, accordingly, a worry that a lubricant is discharged externally due to the pumping out effect as in usual can be prevented.

Furthermore, in the herringbone-shaped grooves 15 disposed at the two upper and lower axially spaced positions, the degree of asymmetry in the lower herringbone-shaped grooves 15 situated on the side opposite to the thrust receiving surface 11, that is, on the opening side of the sleeve 6 is, particularly, made greater than the degree of asymmetry in the upper herringbone-shaped grooves 15, so that the pumping out effect of the lubricant from the opening end of the sleeve 6 can be prevented more completely.

That is, they are formed such that there exists a relationship: ($a - b < d - c$) for the difference of the axial length ($a - b$) between the outer groove segment 15B and the inner groove segment 15A in the upper herringbone-shaped grooves 15 and for the difference of the axial length ($d - c$) between the outer groove segment 15B and the inner groove segment 15A in the lower herringbone-shaped grooves 15.

Since the difference of the axial length between the inner groove segment and the outer groove segment in each of the upper and the lower grooves is formed as: ($a - b < d - c$) as described above, the force of sending the lubricant upwardly is stronger than the force of sending the lubricant downwardly.

For to the force of the pumping effect of the herringbone-shaped grooves 15 as dynamic pressure generating grooves, since the viscosity of the lubricant such as lubricating oil or grease is higher than that of air, the force of sending the lubricant such as lubricant oil or grease is greater than the force of sending air. Therefore, when a little amount of air flows from below to the lower end of the gap of the lower radial bearing, since the force of sending air is less than the force of sending the lubricant, the sum of the force for sending the air upwardly and the force of sending the lubricant upwardly is balanced with the force of sending only the lubricant downwardly.

Accordingly, neither the air continuously flows upwardly from the opening end of the sleeve 6, nor the lubricant leaks downwardly.

Although descriptions have been made to a case in which the herringbone-shaped grooves 15 are disposed to the radial receiving surface 10 which is the outer diametrical surface of the shaft 4 in the above-mentioned embodiment, the herringbone-shaped grooves 15 may be formed to the radial bearing surface 8 which is the inner diametrical surface of the sleeve 6, or the herringbone-shaped grooves 15 may be disposed to both of the radial receiving surface 10 and the radial bearing surface 8.

Further, although a point-contact type sliding bearing is used as the thrust bearing in which the thrust receiver 7 is made of a steel ball and the thrust receiving surface 11 comprises a flat plain, a so-called plain groove dynamic pressure bearing may be used, in which the thrust bearing surface 9 of the thrust receiver 7 is also made as a plain like that the thrust receiving surface 11 and a dynamic pressure generating grooves are disposed to at least one of the both plains.

Furthermore, the dynamic pressure bearing device according to the present invention may be disposed in any optional status and, for instance, it may be disposed laterally, being turned upside down or orthogonally, not disposed vertically as shown in FIG. 1. Further, the shaft may be a rotatable member while the housing 5 may be a stationary member.

Figure 2:
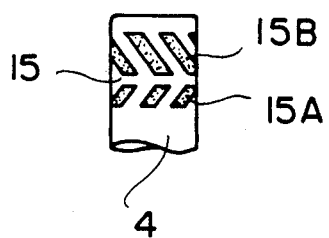
FIG. 2 is a vertical cross sectional view for a principal portion of another embodiment.

FIG. 2 shows another example of the herringbone-shaped grooves 15 in the radial bearing.

This is different from the shape of the grooves in the above-mentioned embodiment in that a portion between the inner groove segment 15A and the outer groove segment 15B is formed discretely. Also in this case, same functions and effects as those described above can be obtained by forming the axial length of the outer groove segment 15B longer than that of the inner groove segment 15A.

Figure 3:
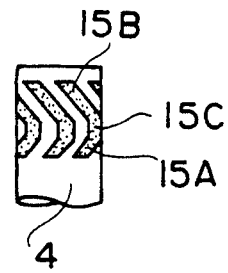
FIG. 3 is a vertical cross sectional view for a principal portion of a further embodiment.
Figure 4:
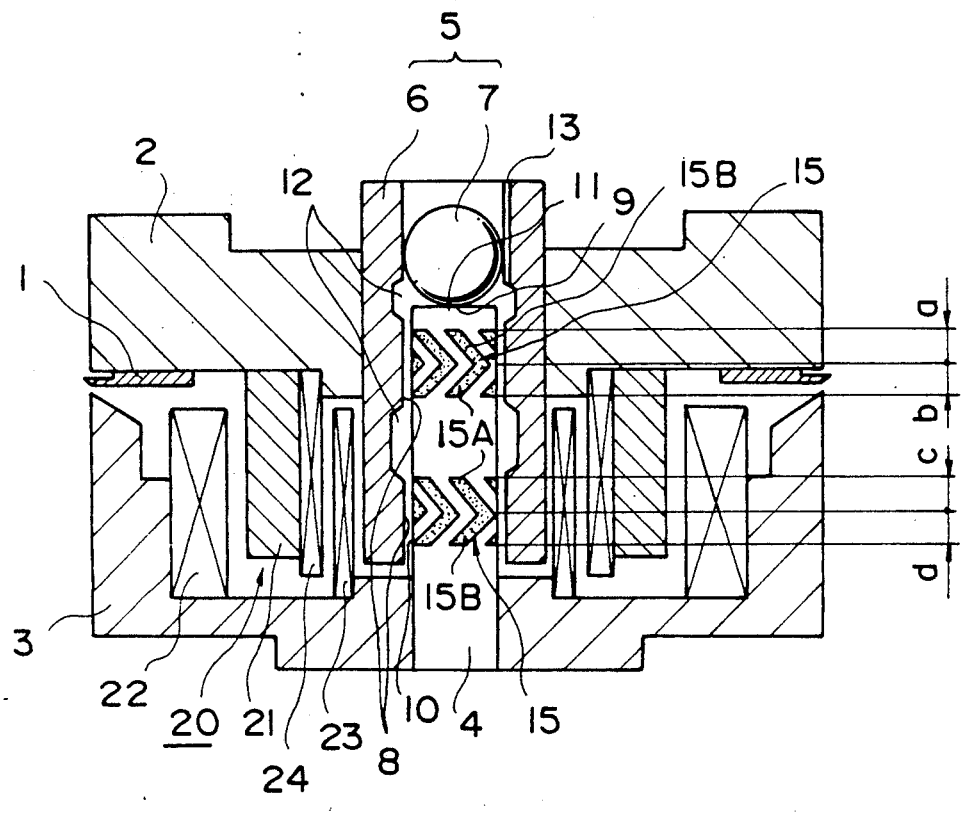
FIG. 4 is a vertical cross sectional view of a conventional type dynamic pressure bearing device.

FIG. 3 shows a further embodiment of the herringbone-shaped grooves. In this case, the inner groove segment 15A and the outer groove segment 15B are connected with a short intermediate groove segment 15C extended in parallel with the shaft. Also in this case, same functions and effects as those in each of the embodiments described above can be obtained by forming the axial length of the outer groove segment 15B longer than that of the inner groove segment 15A.

As has been described above, since it is constituted according to the present invention such that the inner groove segments and the outer groove segments in the herringbone-shaped grooves for generating the dynamic pressure disposed at least to one of the radial bearing surface and the radial receiving surface are made asymmetric to each other so as to enforce the lubricant toward the inside of the bearing device, the lubricant does not flow out of the bearing during rotation and, accordingly, the dynamic pressure bearing device of the present invention does not suffer from degradation of the rotational accuracy caused by the change of torque, can prevent scorching due to the lack of the lubricant and provide the long lasting durability being free from the circumstantial contaminations since the lubricant does not scatter to the outside of the bearing.

What is claimed is:

1. A dynamic pressure bearing device comprising: a housing having a sleeve, a thrust receiver secured to one end of the sleeve, a shaft fit into the sleeve, the sleeve having cylindrical radial bearing surfaces formed on its inner diametrical surface at two axially spaced apart positions, the thrust receiver having a thrust bearing surface, the shaft having a radial receiving surface opposed to the radial bearing surface and a thrust receiving surface opposed to the thrust bearing surface, lubricant pits disposed near the thrust bearing surface, an air escape aperture disposed in the housing for communicating the lubricant pits with external atmosphere, at least one of the radial bearing surface and the radial receiving surface having herringbone-shaped grooves formed thereon including inner spiral groove segments each disposed on the side between the radial bearing surfaces at the two positions and outer spiral groove segments each disposed in a direction different from that of the inner groove segments on the axially outer side, wherein each of the outer groove segments has a longer axial length than that for each of the inner groove segments, and the difference of the axial length between each of the outer groove segments and each of the inner groove segments in the herringbone-shaped grooves disposed on the side opposite to the thrust receiving surface is greater than that difference of the axial length between each of the outer groove segments and each of the inner groove segments in the herringbone-shaped grooves disposed on the side of the thrust receiving surface.

* * * * *